US012613878B2

(12) United States Patent　　(10) Patent No.:　US 12,613,878 B2
Kling et al.　　　　　　　　　　(45) Date of Patent:　　Apr. 28, 2026

(54) SYSTEM AND METHOD FOR DYNAMICALLY ENABLING DATA CONNECTIONS BETWEEN LARGE DATASETS STORED IN A NETWORKED SYSTEM

(71) Applicant: BANK OF AMERICA CORPORATION, Charlotte, NC (US)

(72) Inventors: John Kling, Alexandria, VA (US); William Bock, Charlotte, NC (US); Scott Desmond, Charlotte, NC (US); Charles Dudley, Concord, NC (US); Jordan Lasher, Dallas, NC (US); Sudheer Vajrala, Cary, NC (US); Jason Yeung, Forest Hills, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/823,086

(22) Filed: Sep. 3, 2024

(65) Prior Publication Data

US 2026/0064705 A1　　Mar. 5, 2026

(51) Int. Cl.
　　*G06F 16/248*　　(2019.01)
　　*G06F 16/2457*　　(2019.01)
(52) U.S. Cl.
　　CPC ...... *G06F 16/248* (2019.01); *G06F 16/24578* (2019.01)
(58) Field of Classification Search
　　None
　　See application file for complete search history.

(56) References Cited

U.S. PATENT DOCUMENTS

| | | | |
|---|---|---|---|
| 11,893,091 | B2 * | 2/2024 | Lillard .................. H04L 9/3247 |
| 12,079,207 | B2 * | 9/2024 | Aggarwal ......... G06F 16/24578 |
| 12,169,524 | B2 * | 12/2024 | Sezgin .............. G06F 16/24522 |
| 12,265,788 | B1 * | 4/2025 | Fieldman ............ G06F 21/6218 |
| 12,282,875 | B2 * | 4/2025 | Makhija ........... G06Q 10/06315 |
| 12,288,217 | B1 * | 4/2025 | Krieger .................. G06Q 10/04 |
| 12,321,863 | B2 * | 6/2025 | Creed ..................... G06N 3/04 |

(Continued)

OTHER PUBLICATIONS

Scalable Systems for Large Scale Dynamic Connected Data Processing (Year: 2019).*
Effective Keyword Search in Relational Databases (Year: 2006).*

*Primary Examiner* — Kim T Nguyen
(74) *Attorney, Agent, or Firm* — Moore & Van Allen PLLC; Anoohya Yarlagadda

(57) ABSTRACT

Embodiments of the present invention provide a system for dynamically enabling data connections between large datasets stored in a networked system. The system is configured for allowing users to select at least two datasets from one or more datasets associated with an entity, receiving a selection of a first dataset of the at least two datasets from the users, automatically presenting a set of datasets associated with the first dataset to the users, receiving a selection of a second dataset of the at least two datasets from the set of datasets presented to the users, receiving one or more data connections between at least a first element of the first dataset and at least a second element of the second dataset, and enabling the one or more data connections between at least the first element of the first dataset and at least the second element of the second dataset.

20 Claims, 7 Drawing Sheets

(56)  References Cited

U.S. PATENT DOCUMENTS

| | | | |
|---|---|---|---|
| 12,323,305 B2 * | 6/2025 | Chong | H04L 41/14 |
| 12,401,611 B1 * | 8/2025 | Lavender | H04L 51/212 |
| 2013/0097625 A1 * | 4/2013 | Thorwirth | G11B 27/28 |
| | | | 386/260 |
| 2016/0105719 A1 * | 4/2016 | Thorwirth | H04N 5/913 |
| | | | 725/27 |
| 2018/0027006 A1 * | 1/2018 | Zimmermann | H04L 63/0227 |
| | | | 726/11 |
| 2018/0028292 A1 * | 2/2018 | Pesach | A61C 9/004 |
| 2020/0137097 A1 * | 4/2020 | Zimmermann | H04L 63/1425 |
| 2022/0076143 A1 * | 3/2022 | Saha | G06F 16/907 |
| 2022/0237196 A1 * | 7/2022 | Wang | G06F 16/24573 |
| 2022/0245651 A1 * | 8/2022 | Lillard | G06N 20/20 |
| 2022/0342958 A1 * | 10/2022 | Lillard | G06F 16/51 |
| 2024/0119045 A1 * | 4/2024 | Aggarwal | G06F 16/24556 |
| 2024/0378195 A1 * | 11/2024 | Aggarwal | G06F 16/2428 |
| 2025/0005383 A1 * | 1/2025 | Sharpe | G06N 20/00 |
| 2025/0117431 A1 * | 4/2025 | Sezgin | G06F 16/2423 |
| 2025/0173566 A1 * | 5/2025 | Nath | G06N 3/049 |
| 2025/0299667 A1 * | 9/2025 | Singh | G06F 40/279 |
| 2025/0307525 A1 * | 10/2025 | Foley | G06F 40/284 |
| 2025/0315617 A1 * | 10/2025 | Boué | G06F 16/33295 |
| 2025/0335491 A1 * | 10/2025 | Joshi | G06F 16/3347 |
| 2025/0335878 A1 * | 10/2025 | Vah | G06Q 10/20 |
| 2025/0348550 A1 * | 11/2025 | So | G06F 16/9535 |

* cited by examiner

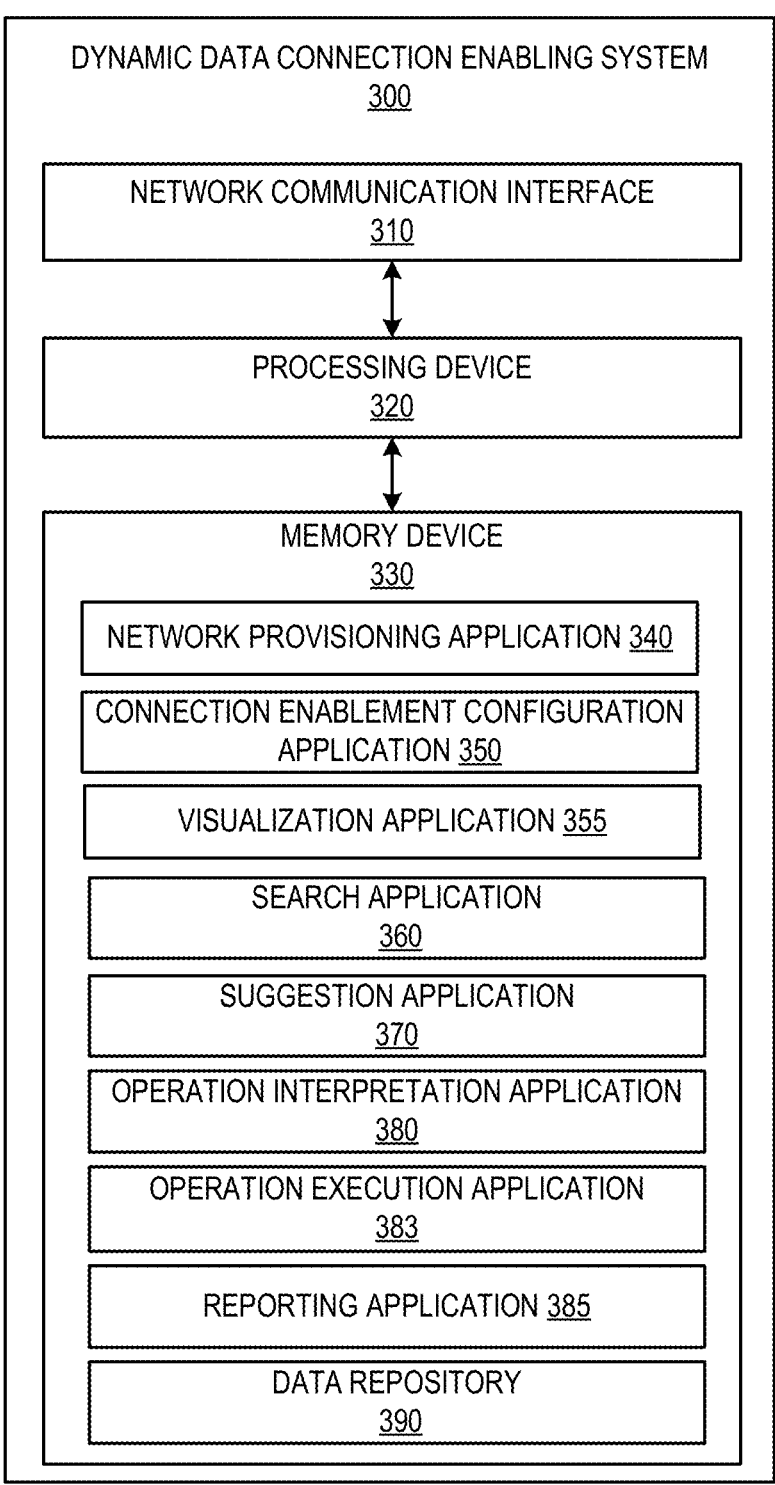

DYNAMIC DATA CONNECTION ENABLING SYSTEM
300

NETWORK COMMUNICATION INTERFACE
310

PROCESSING DEVICE
320

MEMORY DEVICE
330

NETWORK PROVISIONING APPLICATION 340

CONNECTION ENABLEMENT CONFIGURATION
APPLICATION 350

VISUALIZATION APPLICATION 355

SEARCH APPLICATION
360

SUGGESTION APPLICATION
370

OPERATION INTERPRETATION APPLICATION
380

OPERATION EXECUTION APPLICATION
383

REPORTING APPLICATION 385

DATA REPOSITORY
390

FIG. 3

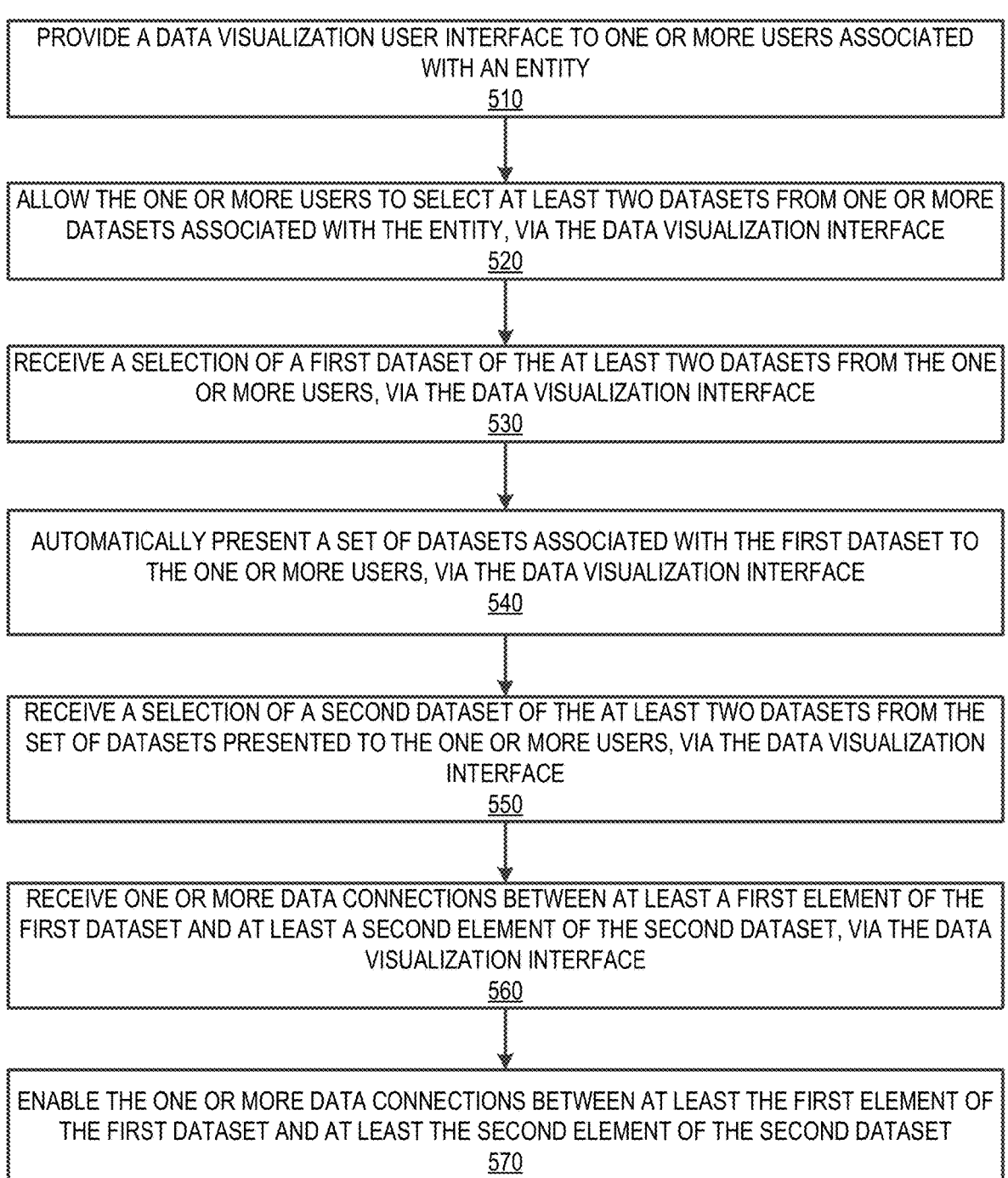

500

PROVIDE A DATA VISUALIZATION USER INTERFACE TO ONE OR MORE USERS ASSOCIATED WITH AN ENTITY
510

ALLOW THE ONE OR MORE USERS TO SELECT AT LEAST TWO DATASETS FROM ONE OR MORE DATASETS ASSOCIATED WITH THE ENTITY, VIA THE DATA VISUALIZATION INTERFACE
520

RECEIVE A SELECTION OF A FIRST DATASET OF THE AT LEAST TWO DATASETS FROM THE ONE OR MORE USERS, VIA THE DATA VISUALIZATION INTERFACE
530

AUTOMATICALLY PRESENT A SET OF DATASETS ASSOCIATED WITH THE FIRST DATASET TO THE ONE OR MORE USERS, VIA THE DATA VISUALIZATION INTERFACE
540

RECEIVE A SELECTION OF A SECOND DATASET OF THE AT LEAST TWO DATASETS FROM THE SET OF DATASETS PRESENTED TO THE ONE OR MORE USERS, VIA THE DATA VISUALIZATION INTERFACE
550

RECEIVE ONE OR MORE DATA CONNECTIONS BETWEEN AT LEAST A FIRST ELEMENT OF THE FIRST DATASET AND AT LEAST A SECOND ELEMENT OF THE SECOND DATASET, VIA THE DATA VISUALIZATION INTERFACE
560

ENABLE THE ONE OR MORE DATA CONNECTIONS BETWEEN AT LEAST THE FIRST ELEMENT OF THE FIRST DATASET AND AT LEAST THE SECOND ELEMENT OF THE SECOND DATASET
570

FIG. 5

SYSTEM AND METHOD FOR DYNAMICALLY ENABLING DATA CONNECTIONS BETWEEN LARGE DATASETS STORED IN A NETWORKED SYSTEM

BACKGROUND

There exists a need for a system for dynamically enabling data connections between large datasets stored in a networked system.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically enabling data connections between large datasets stored in a networked system. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention provides a data visualization user interface to one or more users associated with an entity, allows the one or more users to select at least two datasets from one or more datasets associated with the entity, via the data visualization interface, receives a selection of a first dataset of the at least two datasets from the one or more users, via the data visualization interface, automatically presents a set of datasets associated with the first dataset to the one or more users, via the data visualization interface, receives a selection of a second dataset of the at least two datasets from the set of datasets presented to the one or more users, via the data visualization interface, receives one or more data connections between at least a first element of the first dataset and at least a second element of the second dataset, via the data visualization interface, and enables the one or more data connections between at least the first element of the first dataset and at least the second element of the second dataset.

In some embodiments, the present invention automatically presents the set of datasets based on scanning the first dataset to select an anchor element from one or more elements in the first dataset and performing keyword matching to determine the set of datasets potentially linked to the first dataset based on the anchor element.

In some embodiments, the keyword matching is at least one of single keyword matching and a sequential keyword matching.

In some embodiments, the present invention assigns a weight to each of the set of datasets based on one or more factors, prioritizes order of the set of datasets based on the weight assigned to each of the set of datasets, and displays the set of datasets based on prioritization of the set of datasets.

In some embodiments, the present invention determines existing connections between elements of the first dataset and elements of the second dataset and displays the existing connections between the elements of the first dataset and the elements of the second dataset.

In some embodiments, the present invention receives a selection to modify or delete the existing connections between the elements of the first dataset and the elements of the second dataset and performs modification or deletion of the existing connections between the elements of the first dataset and the elements of the second dataset.

In some embodiments, the present invention generates one or more suggestions associated with potential data connections between elements of the first dataset and elements of the second dataset and displays the one or more suggestions to the one or more users, via the data visualization interface.

In some embodiments, the one or more data connections received from the user are based on the one or more suggestions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
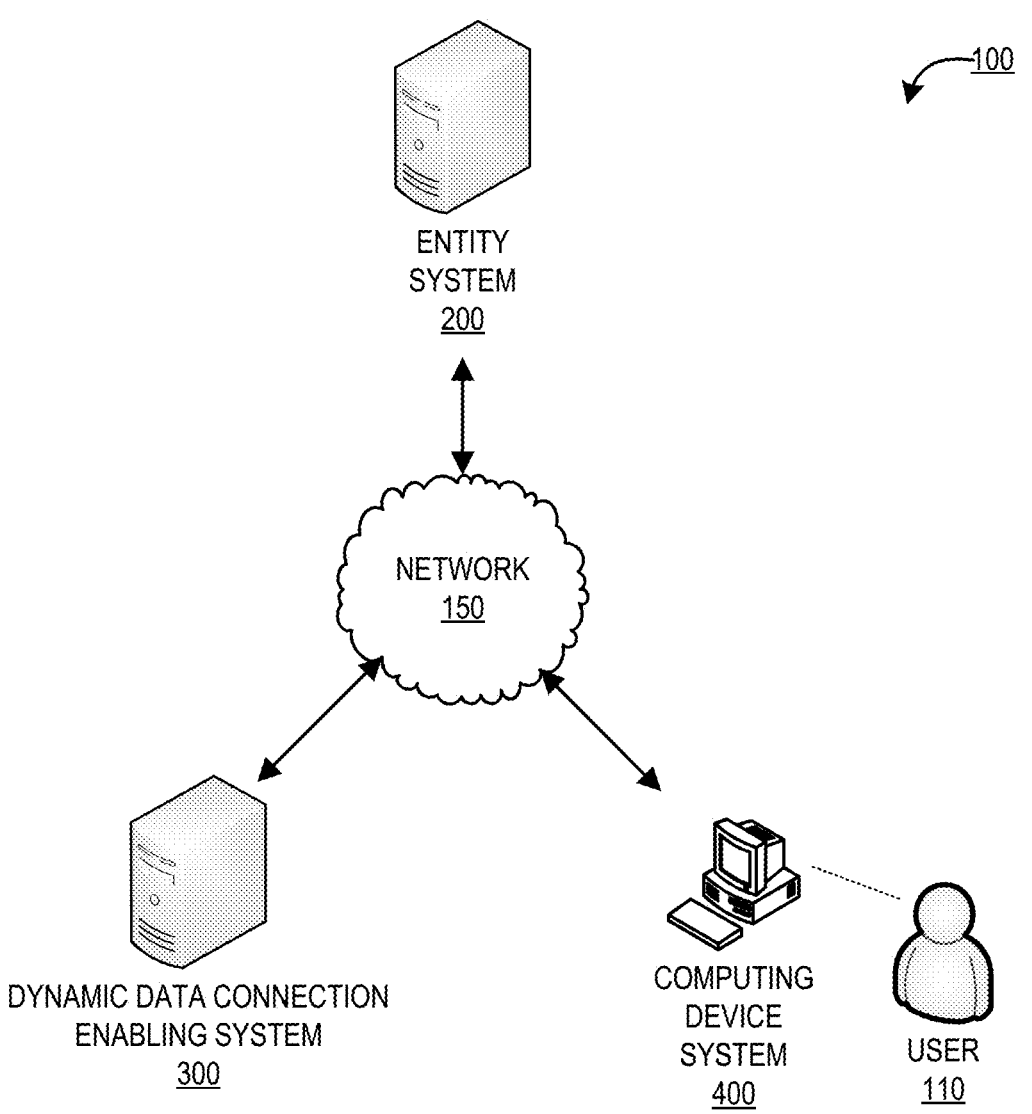
Figure 2:
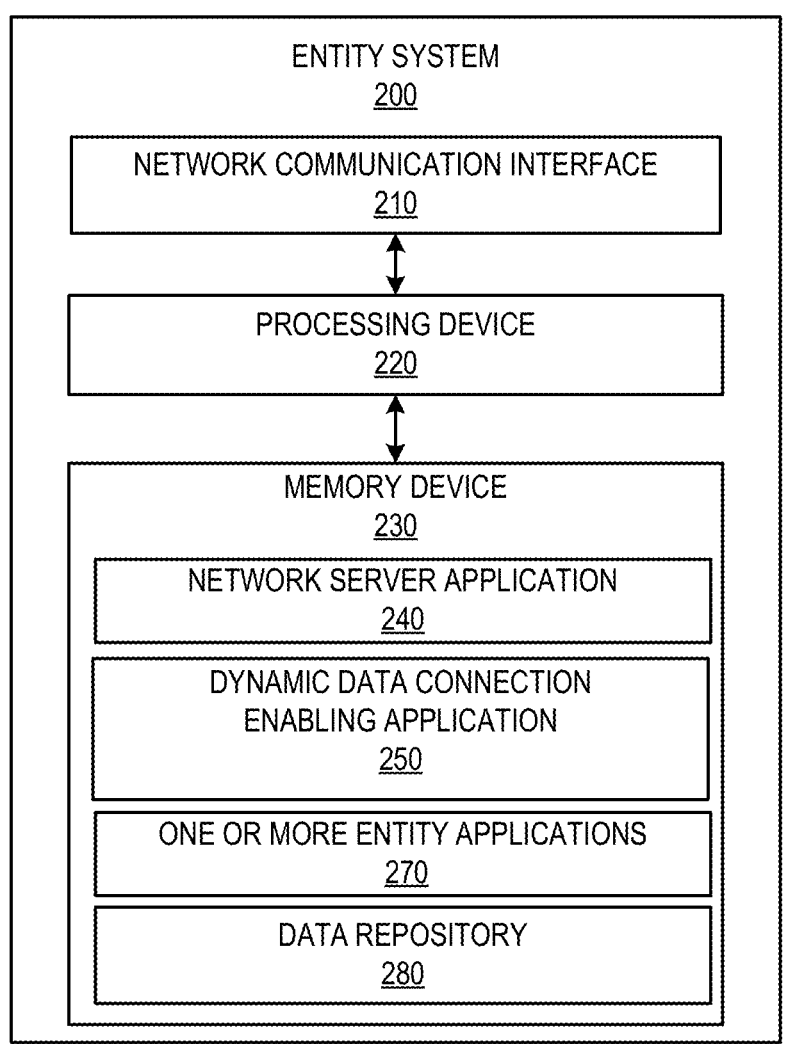
Figure 4:
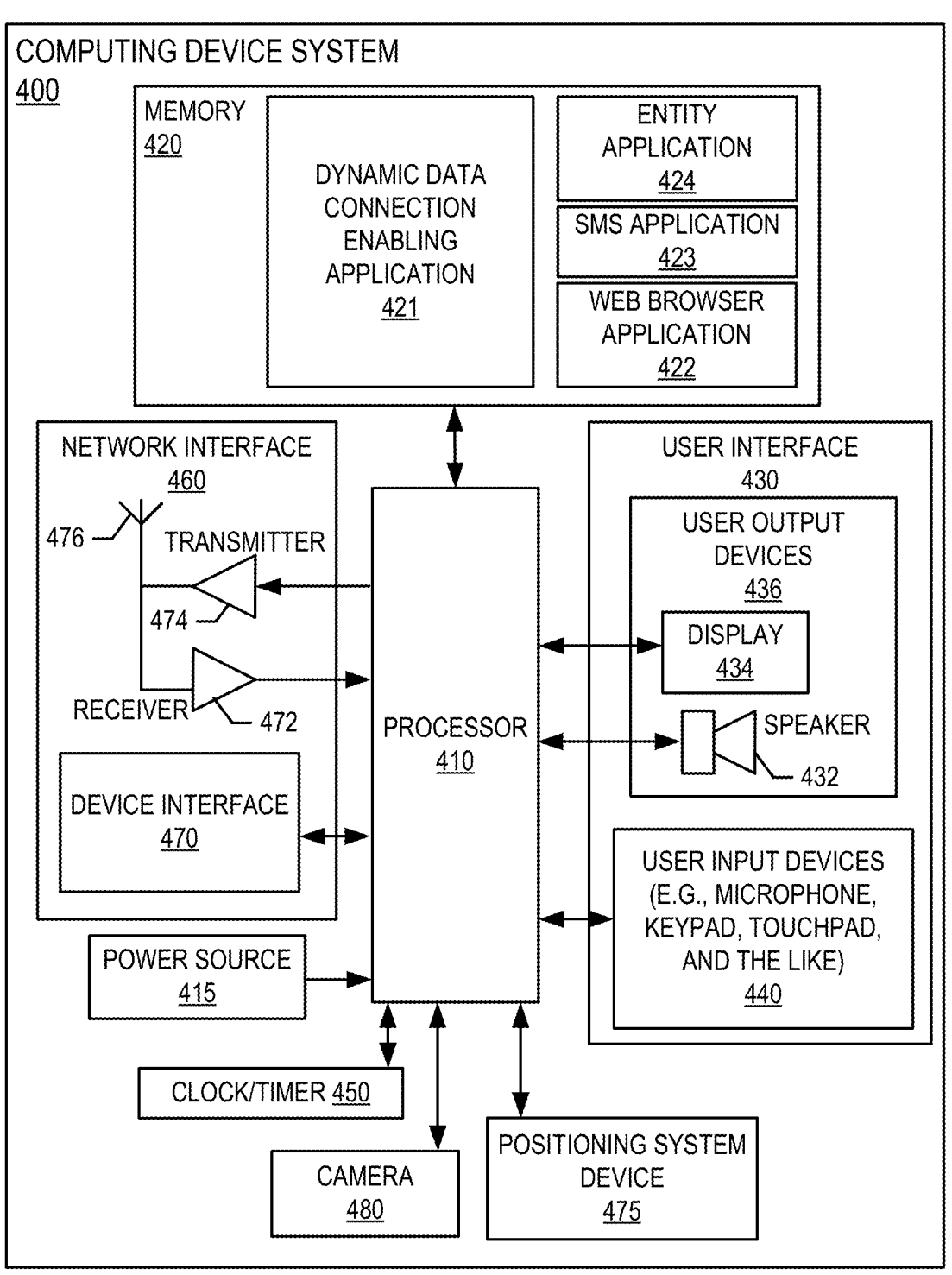
Figure 6:
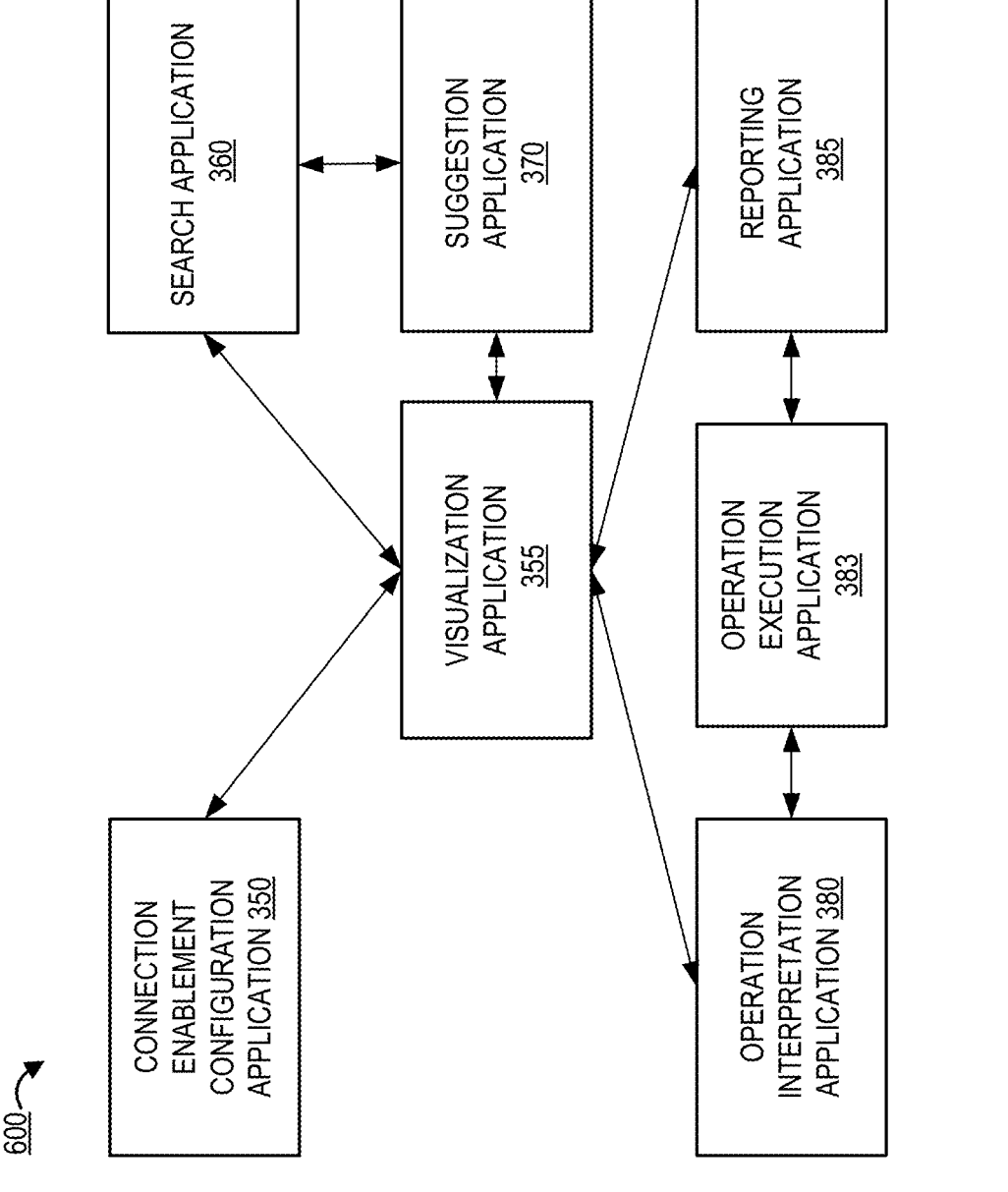
Figure 7:
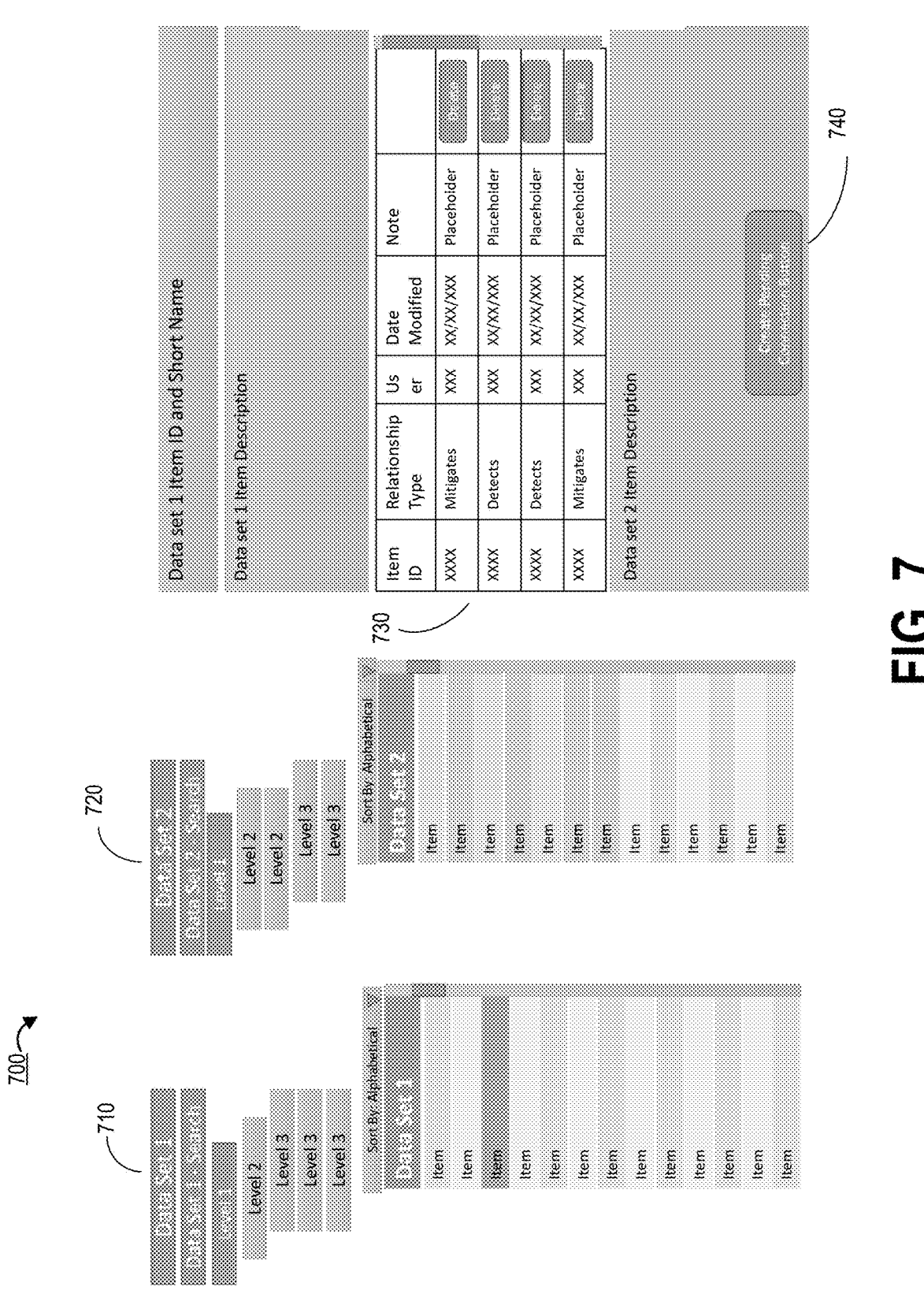

Having thus described embodiments of the invention in general terms, reference will now be made the accompanying drawings, wherein:

FIG. 1 provides a block diagram illustrating a system environment for dynamically enabling data connections between large datasets stored in a networked system, in accordance with an embodiment of the invention;

FIG. 2 provides a block diagram illustrating the entity system 200 of FIG. 1, in accordance with an embodiment of the invention;

FIG. 3 provides a block diagram illustrating a dynamic data connection enabling system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for dynamically enabling data connections between large datasets stored in a networked system, in accordance with an embodiment of the invention;

FIG. 6 provides a block diagram illustrating the process of dynamically enabling data connections between large datasets stored in a networked system, in accordance with an embodiment of the invention; and FIG. 7 provides an example of visualization associated with enabling data connections between large datasets, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that creates, manages, maintains, utilizes, stores, and/or the like large datasets, where large datasets may be utilized by one or more entity applications associated with the entity to perform one or more operations associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution. As described herein, a "user" may be an employee, a customer, or a potential customer of the entity.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, entities create, manage, maintain, utilize, store, handle, and/or the like large datasets, where large datasets may be utilized by one or more entity applications associated with the entity to perform one or more operations associated with the entity. Elements in such large datasets may potentially be related to each other. However, conventional systems do not provide an efficient and quick way to connect the elements within the large datasets that are related to each other. As such, there exists a need for a system to dynamically enable data connections between large datasets stored in a networked system. The system of the present invention solves this problem as described in detail below.

FIG. 1 provides a block diagram illustrating a system environment 100 for dynamically enabling data connections between large datasets stored in a networked system, in accordance with an embodiment of the invention. As illustrated in FIG. 1, the environment 100 includes a dynamic data connection enabling system 300, an entity system 200, external systems 201, and a computing device system 400. One or more users 110 may be included in the system environment 100, where the users 110 interact with the other entities of the system environment 100 via a user interface of the computing device system 400. In some embodiments, the one or more users 110 may be employees (e.g., full time employees, part time employees, contractors, sub-contractors, and/or the like) of the entity associated with the entity system 200.

The entity system(s) 200 may be any system owned or otherwise controlled by an entity to support or perform one or more process steps described herein. In some embodiments, the entity may be any organization that creates, manages, maintains, utilizes, stores, and/or the like large datasets, where large datasets may be utilized by one or more entity applications associated with the entity to perform one or more operations associated with the entity. In some embodiments, the entity is a financial institution. In some embodiments, the entity is a non-financial institution.

The dynamic data connection enabling system 300 is a system of the present invention for performing one or more process steps described herein. In some embodiments, the dynamic data connection enabling system 300 may be an independent system. In some embodiments, the dynamic data connection enabling system 300 may be a part of the entity system 200. In some embodiments, the dynamic data connection enabling system 300 may be controlled, owned, managed, and/or maintained by the entity associated with the entity system 200.

The dynamic data connection enabling system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the dynamic data connection enabling system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the dynamic data connection enabling system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/ repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a dynamic data connection enabling application 250, one or more entity applications 270, and a data repository 280. The one or more entity applications 270 may be any applications developed, supported, maintained, utilized, and/or controlled by the entity. The computer-executable program code of the network server application 240, the dynamic data connection enabling application 250, the one or more entity application 270 to perform certain logic, data-extraction, and data-storing functions of the entity system 200 described herein, as well as communication functions of the entity system 200.

The network server application 240, the dynamic data connection enabling application 250, and the one or more entity applications 270 are configured to store data in the data repository 280 or to use the data stored in the data repository 280 when communicating through the network communication interface 210 with the dynamic data connection enabling system 300, and/or the computing device system 400 to perform one or more process steps described herein. In some embodiments, the entity system 200 may receive instructions from the dynamic data connection enabling system 300 via the dynamic data connection enabling application 250 to perform certain operations. The dynamic data connection enabling application 250 may be provided by the dynamic data connection enabling system 300. The one or more entity applications 270 may be any of the applications used, created, modified, facilitated, developed, and/or managed by the entity system 200.

FIG. 3 provides a block diagram illustrating the dynamic data connection enabling system 300 in greater detail, in accordance with embodiments of the invention. As illustrated in FIG. 3, in one embodiment of the invention, the dynamic data connection enabling system 300 includes one or more processing devices 320 operatively coupled to a network communication interface 310 and a memory device 330. In certain embodiments, the dynamic data connection enabling system 300 is operated by an entity, such as a financial institution. In some embodiments, the dynamic data connection enabling system 300 is owned or operated by the entity of the entity system 200. In some embodiments, the dynamic data connection enabling system 300 may be an independent system. In alternate embodiments, the dynamic data connection enabling system 300 may be a part of the entity system 200.

It should be understood that the memory device 330 may include one or more databases or other data structures/ repositories. The memory device 330 also includes computer-executable program code that instructs the processing device 320 to perform processing operations described herein and to operate the network communication interface

310 to perform certain communication functions of the dynamic data connection enabling system 300. For example, in one embodiment of the dynamic data connection enabling system 300, the memory device 330 includes, but is not limited to, a network provisioning application 340, a connection enablement configuration application 350, a visualization application 355, a search application 360, a suggestion application 370, an operation interpretation application 380, an operation execution application 383, a reporting application 385, and a data repository 390 comprising any data processed or accessed by one or more applications in the memory device 330. The computer-executable program code of the network provisioning application 340, the connection enablement configuration application 350, the visualization application 355, the search application 360, the suggestion application 370, the operation interpretation application 380, the operation execution application 383, and the reporting application 385 may instruct the processing device 320 to perform certain logic, data-processing, and data-storing functions of the dynamic data connection enabling system 300 described herein, as well as communication functions of the dynamic data connection enabling system 300.

The network provisioning application 340, the connection enablement configuration application 350, the visualization application 355, the search application 360, the suggestion application 370, the operation interpretation application 380, the operation execution application 383, and the reporting application 385 are configured to invoke or use the data in the data repository 390 when communicating through the network communication interface 310 with the entity system 200, and/or the computing device system 400. In some embodiments, the network provisioning application 340, the connection enablement configuration application 350, the visualization application 355, the search application 360, the suggestion application 370, the operation interpretation application 380, the operation execution application 383, and the reporting application 385 may store the data extracted or received from the entity system 200, and the computing device system 400 in the data repository 390. In some embodiments, the network provisioning application 340, the connection enablement configuration application 350, the visualization application 355, the search application 360, the suggestion application 370, the operation interpretation application 380, the operation execution application 383, and the reporting application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a dynamic data connection enabling application 421, entity application 424. These applications also typically instructions to a graphical user interface (GUI) on the display 430 that allows the user 110 to interact with the entity system 200, the dynamic data connection enabling system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the dynamic data connection enabling application 421 provided by the dynamic data connection enabling system 300 allows the user 110 to access the dynamic data connection enabling system 300. In some embodiments, the entity application 424 provided by the entity system 200 and the dynamic data connection enabling application 421 allow the user 110 to access the functionalities provided by the dynamic data connection enabling system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for dynamically enabling data connections between large datasets stored in a networked system, in accordance with an embodiment of the invention. As shown in block 510, the system provides a data visualization user interface to one or more users associated with an entity. The data visualization user interface may comprise any type of user interface elements to present one or more features provided by the system of the present invention to the one or more users. In some embodiments, the one or more users may be employees of the entity. In some embodiments, the system of the present invention may be configurable to any type of datasets associated with an entity. In one example, the system may allow users to establish data connections between large datasets associated with customer interactions. In another example, the system may allow users to establish data connections between large datasets associated with cybersecurity. In another example, the system may allow users to establish data connections between large datasets associated with correlations of financial markets.

As shown in block 520, the system allows the one or more users to select at least two datasets from one or more datasets associated with the entity, via the data visualization interface. As shown in block 530, the system receives a selection of a first dataset of the at least two datasets from the one or more users, via the data visualization interface.

As shown in block 540, the system in response to receiving the selection of the first dataset, the system may automatically present a set of datasets associated with the first dataset to the one or more users, via the data visualization interface. In some embodiments, automatically presenting the set of datasets comprises scanning the first dataset to select an anchor element from one or more elements in the first dataset and performing keyword matching to determine the set of datasets potentially linked to the first dataset based on the anchor element. In some embodiments, the keyword matching may be a single keyword matching. In some embodiments, the keyword matching may be sequential keyword matching. For example, the system may perform n-gram matching, where the n-gram matching may be a 3-gram matching, 4-gram matching, and/or the like.

In some embodiments, the system may assign a weight to each of the set of datasets based on one or more factors, prioritize order of the set of datasets based on the weight assigned to each of the set of datasets, and display the set of datasets based on prioritization of the set of datasets. In some embodiments, the system may display only one dataset that has the highest weight instead of displaying the set of datasets. In some such embodiments, if the user does not select the dataset presented by the system, the system then presents the set of datasets based on the weights assigned to each of the set of datasets. In some embodiments, the system may use machine learning models to assign weights and/or to generate the set of datasets. In some embodiments, the system may tune the machine learning models based on selections of the one or more users.

As shown in block 550, the system receives a selection of a second dataset of the at least two datasets from the set of datasets presented to the one or more users, via the data visualization interface. In some embodiments, the user may select the second dataset from the set of datasets based on the weight assigned to each of the set of datasets.

As shown in block 560, the system receives one or more data connections between at least a first element of the first dataset and at least a second element of the second dataset, via the data visualization interface. In some embodiments, the system may generate one or more suggestions associated with potential data connections between elements of the first dataset and elements of the second dataset and display the one or more suggestions to the one or more users, via the data visualization interface. In some such embodiments, the one or more data connections received from the user may be based on the one or more suggestions.

As shown in block 570, the system enables the one or more data connections between at least the first element of the first dataset and at least the second element of the second dataset. In some embodiments, enabling the one or more data connections may comprise loading the at least two datasets selected by the user into a graph database, where the one or more data connections are directed edges in the graph database, where label selected to describe the edge depends on nature of the connection and the direction.

In some embodiments, the system may determine existing connections between elements of the first dataset and elements of the second dataset and display the existing connections between the elements of the first dataset and the elements of the second dataset. In some embodiments, the system may receive a selection to modify or delete the existing connections between the elements of the first dataset and the elements of the second dataset and perform modification or deletion of the existing connections between the elements of the first dataset and the elements of the second dataset.

FIG. 6 provides a block diagram illustrating the process of dynamically enabling data connections between large datasets stored in a networked system, in accordance with an embodiment of the invention. As shown, the visualization application 355 of the system may present the data visualization user interface to the user 110 associated with the entity associated with the entity system 200. The connection enablement configuration application 350 may allow the user 110 to configure the system based on a type of application (use case) that the system is being used for. The connection enablement configuration application 350 may present one or more configurable parameters to the user 110 via the data visualization user interface provided by the visualization application 355. Based on the configurable parameters received from the user 110, the connection enablement configuration application 350 may configure the system. After completion of the configuration, the system may allow the user 110 to select one or more datasets. Upon receiving a selection of the first dataset, via the data visualization user interface, the search application 360 may scan the first dataset to identify significant elements of the first dataset. The search application 360 transmits the identified significant elements to the suggestion application 370 which then selects an anchor element from the significant elements and performs keyword matching based on the anchor element to determine the set of datasets that could potentially be associated with the first dataset. The suggestion application 370 may also rank the set of datasets, prioritize the set of datasets based on ranking, and present the prioritized set of datasets to the users 110 via the data visualization user interface. Based on the ranking, the user 110 may select the second dataset of the set of datasets. Upon receiving the selection of the second dataset, the suggestion application 370 may also provide one or more suggestions associated with the potential data connections and/or modification or deletion of existing connections between elements of the first dataset and elements of the second dataset, via the data visualization user interface. The user 110 may provide one or more operations (e.g., create, modify, delete, and/or the like) via the data visualization user interface. Upon receiving the one or more operations, the operation interpretation application 380 may interpret the operation and provide the analysis to the operation execution application 383 which then establishes, enables, modifies, and/or deletes one or more data connections between elements of the first dataset and elements of the second dataset. The reporting application 385 may generate and display reports to the user 110, where the reports may provide information associated the data connections associated with the first dataset and the second dataset.

FIG. 7 provides an example of visualization associated with enabling data connections between large datasets, in accordance with an embodiment of the invention. It should be understood that the example data visualization user interface 700 shown in FIG. 7 is for illustrative purposes only and in no way delineates the scope of the invention. In some embodiments, the data visualization user interface may comprise additional data not shown in FIG. 7. In some embodiments, the data visualization user interface may comprise different and/or additional styling elements that are not shown in FIG. 7. As shown in one illustration, the data visualization user interface may comprise a first dataset 710 and a second dataset 720 selected by the user 110, where each of the datasets may further comprise n-levels of data, where each level of the n-levels may further comprise one or more elements. The data visualization user interface may also comprise a list one or more connections between elements of the first dataset 710 and elements of the second dataset 720 and one or more operations performed by the user 110 associated with the data connections as shown in reference 730. In some embodiments, the system may also display one or more suggestions provided by the system in the data visualization user interface. In some embodiments, the data visualization user interface may further comprise one or more buttons for performing one or more operations (e.g., create connection button 740, modify, delete, and/or the like).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and sub-stitutions, in addition to those set forth in the above para-graphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically enabling data connections between large datasets stored in a networked system, the system comprising:
   at least one network communication interface;
   at least one non-transitory storage device; and
   at least one processing device coupled to the at least one non-transitory storage device and the at least one network communication interface, wherein the at least one processing device is configured to:
      provide a data visualization user interface to one or more users associated with an entity;
      allow the one or more users to select at least two datasets from one or more datasets associated with the entity, via the data visualization interface;
      receive a selection of a first dataset of the at least two datasets from the one or more users, via the data visualization interface;
      automatically present a set of datasets associated with the first dataset to the one or more users, via the data visualization interface, wherein automatically pre-senting the set of datasets associated with the first dataset comprises:
         scanning the first dataset to select an anchor element from one or more elements in the first dataset; and
         performing keyword matching to determine the set of datasets potentially linked to the first dataset based on the anchor element;
      receive a selection of a second dataset of the at least two datasets from the set of datasets presented to the one or more users, via the data visualization inter-face;
      receive one or more data connections between at least a first element of the first dataset and at least a second element of the second dataset, via the data visual-ization interface; and
      enable the one or more data connections between at least the first element of the first dataset and at least the second element of the second dataset, wherein enabling the one or more data connections comprises loading the at least two datasets selected by the user into a graph database, wherein the one or more data connections are directed edges in the graph database, wherein label selected to describe the directed edges is based on on nature of the one or more data connections and direction of the one or more data connections.

2. The system of claim 1, wherein the keyword matching is at least one of single keyword matching and a sequential keyword matching.

3. The system of claim 2, wherein the sequential keyword matching is an n-gram matching.

4. The system of claim 1, wherein the at least one processing device is configured to:
   assign a weight to each of the set of datasets based on one or more factors;
   prioritize order of the set of datasets based on the weight assigned to each of the set of datasets; and
   display the set of datasets based on prioritization of the set of datasets.

5. The system of claim 1, wherein the at least one processing device is configured to:
   determine existing connections between elements of the first dataset and elements of the second dataset; and
   display the existing connections between the elements of the first dataset and the elements of the second dataset.

6. The system of claim 5, wherein the at least one processing device is configured to:
   receive a selection to modify or delete the existing con-nections between the elements of the first dataset and the elements of the second dataset; and
   perform modification or deletion of the existing connec-tions between the elements of the first dataset and the elements of the second dataset.

7. The system of claim 1, wherein the at least one processing device is configured to:
   generate one or more suggestions associated with poten-tial data connections between elements of the first dataset and elements of the second dataset; and
   display the one or more suggestions to the one or more users, via the data visualization interface.

8. The system of claim 1, wherein the one or more data connections received from the user are based on the one or more suggestions.

9. A computer program product for dynamically enabling data connections between large datasets stored in a net-worked system, the computer program product comprising a non-transitory computer-readable storage medium having computer executable instructions for causing a computer processor to perform the steps of:
   providing a data visualization user interface to one or more users associated with an entity;
   allowing the one or more users to select at least two datasets from one or more datasets associated with the entity, via the data visualization interface;
   receiving a selection of a first dataset of the at least two datasets from the one or more users, via the data visualization interface;
   automatically presenting a set of datasets associated with the first dataset to the one or more users, via the data visualization interface, wherein automatically present-ing the set of datasets associated with the first dataset comprises:
      scanning the first dataset to select an anchor element from one or more elements in the first dataset; and
      performing keyword matching to determine the set of datasets potentially linked to the first dataset based on the anchor element;

receiving a selection of a second dataset of the at least two datasets from the set of datasets presented to the one or more users, via the data visualization interface;

receiving one or more data connections between at least a first element of the first dataset and at least a second element of the second dataset, via the data visualization interface; and enabling the one or more data connections between at least the first element of the first dataset and at least the second element of the second dataset, wherein enabling the one or more data connections comprises loading the at least two datasets selected by the user into a graph database, wherein the one or more data connections are directed edges in the graph database, wherein label selected to describe the directed edges is based on on nature of the one or more data connections and direction of the one or more data connections.

10. The computer program product of claim 9, wherein the computer executable instructions cause the computer processor to perform the steps of:

assigning a weight to each of the set of datasets based on one or more factors;

prioritizing order of the set of datasets based on the weight assigned to each of the set of datasets; and displaying the set of datasets based on prioritization of the set of datasets.

11. The computer program product of claim 9, wherein the keyword matching is at least one of single keyword matching and a sequential keyword matching.

12. The computer program product of claim 11, wherein the sequential keyword matching is an n-gram matching.

13. The computer program product of claim 9, wherein the computer executable instructions cause the computer processor to perform the steps of:

generating one or more suggestions associated with potential data connections between elements of the first dataset and elements of the second dataset; and displaying the one or more suggestions to the one or more users, via the data visualization interface.

14. The computer program product of claim 13, wherein the one or more data connections received from the user are based on the one or more suggestions.

15. A computer implemented method for dynamically enabling data connections between large datasets stored in a networked system, wherein the method comprises:

providing a data visualization user interface to one or more users associated with an entity;

allowing the one or more users to select at least two datasets from one or more datasets associated with the entity, via the data visualization interface;

receiving a selection of a first dataset of the at least two datasets from the one or more users, via the data visualization interface;

automatically presenting a set of datasets associated with the first dataset to the one or more users, via the data visualization interface, wherein automatically presenting the set of datasets associated with the first dataset comprises:

scanning the first dataset to select an anchor element from one or more elements in the first dataset; and performing keyword matching to determine the set of datasets potentially linked to the first dataset based on the anchor element;

receiving a selection of a second dataset of the at least two datasets from the set of datasets presented to the one or more users, via the data visualization interface;

receiving one or more data connections between at least a first element of the first dataset and at least a second element of the second dataset, via the data visualization interface; and enabling the one or more data connections between at least the first element of the first dataset and at least the second element of the second dataset, wherein enabling the one or more data connections comprises loading the at least two datasets selected by the user into a graph database, wherein the one or more data connections are directed edges in the graph database, wherein label selected to describe the directed edges is based on on nature of the one or more data connections and direction of the one or more data connections.

16. The computer implemented method of claim 15, wherein the method comprises:

assigning a weight to each of the set of datasets based on one or more factors;

prioritizing order of the set of datasets based on the weight assigned to each of the set of datasets; and displaying the set of datasets based on prioritization of the set of datasets.

17. The computer implemented method of claim 15, wherein the keyword matching is at least one of single keyword matching and a sequential keyword matching.

18. The computer implemented method of claim 17, wherein the sequential keyword matching is an n-gram matching.

19. The computer implemented method of claim 15, wherein the method comprises:

generating one or more suggestions associated with potential data connections between elements of the first dataset and elements of the second dataset; and displaying the one or more suggestions to the one or more users, via the data visualization interface.

20. The computer implemented method of claim 19, wherein the one or more data connections received from the user are based on the one or more suggestions.

* * * * *